No. 776,078. PATENTED NOV. 29, 1904.
J. F. MURPHY.
RUNNING GEAR FOR VEHICLES.
APPLICATION FILED JAN. 15, 1904.
NO MODEL. 2 SHEETS—SHEET 1.
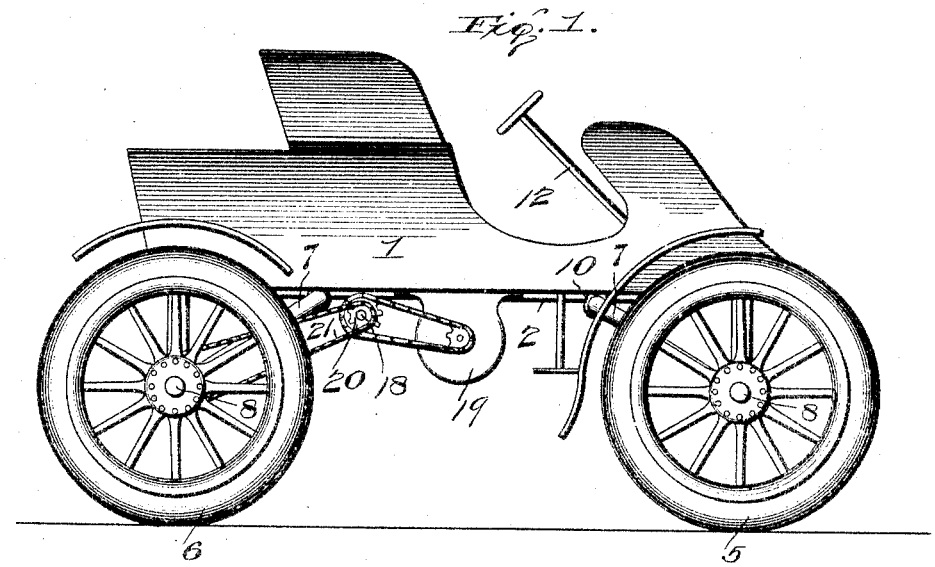
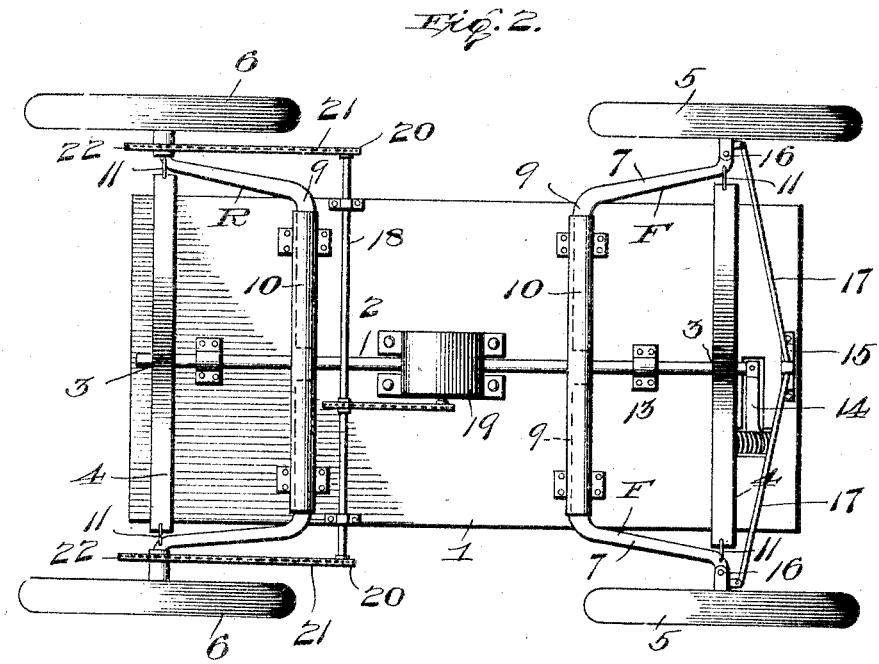

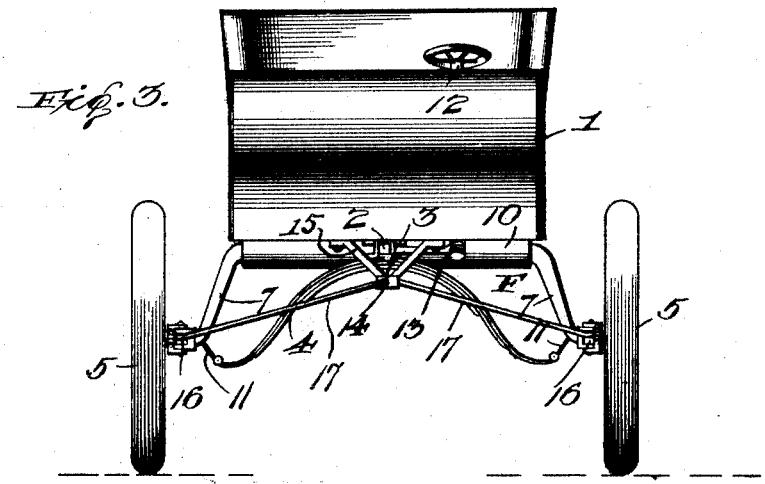
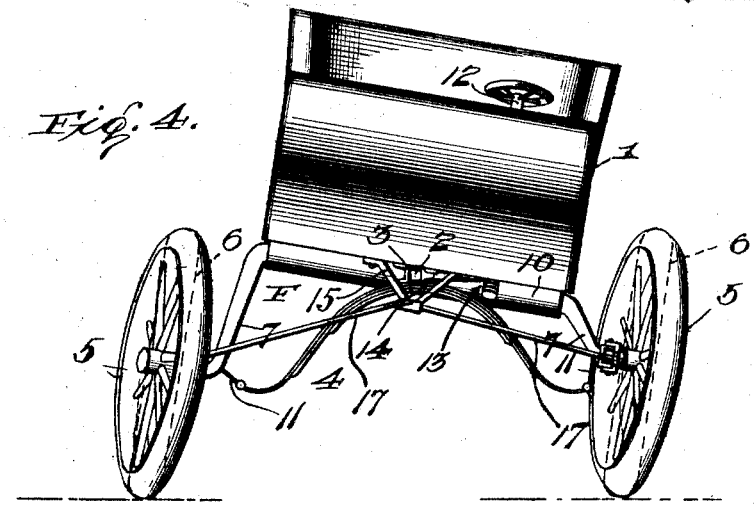
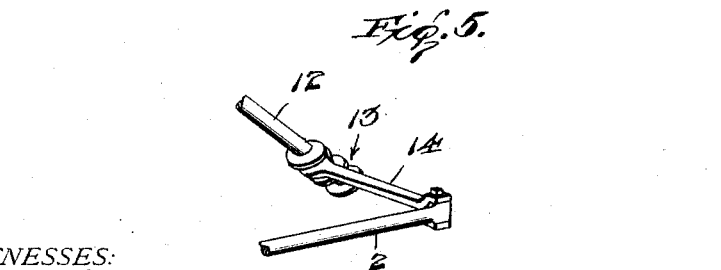

No. 776,078. Patented November 29, 1904.

UNITED STATES PATENT OFFICE.

JOHN F. MURPHY, OF JACKSON, MICHIGAN.

RUNNING-GEAR FOR VEHICLES.

SPECIFICATION forming part of Letters Patent No. 776,078, dated November 29, 1904.

Application filed January 15, 1904. Serial No. 189,189. (No model.)

*To all whom it may concern:*

Be it known that I, JOHN F. MURPHY, a citizen of the United States, residing at Jackson, in the county of Jackson and State of Michigan, have invented certain new and useful Improvements in Running-Gear for Vehicles, of which the following is a specification.

This invention relates to running-gear for vehicles, and more especially to an improved short-turning gear possessing special utility in connection with speed-carriages of the motor-vehicle or automobile type.

To this end the invention primarily has in view a simple and practical arrangement of running-gear which not only provides for a short turning of the vehicle in rounding curves or corners, but so positions the body and wheels of the vehicle as to counteract or effectually resist the overturning, skidding, and straining tendency occasioned by the centrifugal force incident to an accelerating speed in rounding a curve or corner. In the accomplishment of this object the invention provides for inclining the body of the vehicle to shift the center of gravity closer to the inner wheels on the curve and also to incline all of the wheels in unison or synchronously with the body, whereby the wheels maintain a parallelism to the sides of the body. By reason of this arrangement the invention is intended to counteract or overcome the centrifugal tendency by disposing the weight of the car and its occupants in the plane of the wheels, thus eliminating the objectionable side slipping or skidding, as well as the end thrust and side strain on the frame and bearings.

Furthermore, the arrangement described provides for giving a natural roll to the wheel on account of its inclination, (as the tendency of the wheel when inclined is to roll in a circle), thus securing a motion in rounding curves similar to that of a bicycle, thereby contributing largely to the pleasure of automobile driving as well as accomplishing the mechanical results above indicated.

With these and many other objects in view, which will more readily appear as the nature of the invention is better understood, the same consists in the novel contruction, combination, and arrangement of parts as hereinafter fully illustrated, described, and claimed.

The essential features of the invention involving the novel mounting of the vehicle body and wheels to provide for the synchronous inclination thereof and the shifting of the center of gravity toward and from the inner wheels are susceptible of structural change without departing from the scope of the invention; but the preferred embodiment thereof is shown in the accompanying drawings, in which—

Figure 1 is a diagrammatic elevation of a motor-vehicle equipped with the running-gear contemplated by the present invention. Fig. 2 is a bottom plan view of the same, showing in dotted lines the action of the front wheels for short-turning purposes. Fig. 3 is an end view of the vehicle, showing the normal positions of the parts. Fig. 4 is a similar view showing the body and the wheels tilted to one side of the vertical plane as in the act of rounding a curve. Fig. 5 is a detail view for illustrative purposes, showing an adjusting mechanism for adjusting or controlling the body with means for effecting a steering or turning of the front wheels.

Like reference characters designate like parts in all the figures of the drawings.

In carrying out the invention the running-gear may be applied to any type of speed-vehicle, but is more especially designed for use in connection with the common motor-car, so for illustrative purposes this application of the invention is shown in the drawings.

Referring particularly to the drawings, the numeral 1 designates the body of a motor-vehicle, which in the present invention is designed to be transversely tiltable to either side of the vertical plane of a longitudinal axis provided for through the employment of a longitudinal reach-shaft 2, disposed longitudinally beneath the vehicle-body and approximately extending the entire length thereof. The transversely-tiltable vehicle-body is loosely mounted on said shaft in any suitable manner, and to the front and rear ends of the reach-shaft 2 are rigidly bolted or otherwise suitably secured, as at 3, the transversely-arranged end body-supporting springs 4, preferably of a semi-elliptical form. The end body-supporting springs 4 have the rigid connection 3 with the ends of the shaft 2 at a point centrally between their ends and are disposed below the plane of the shaft 2 to provide for the proper supporting of the vehicle-body and the swinging action of the wheel-carrying axles. These axles are arranged in front and rear pairs for carrying front and rear vehicle-wheels 5 and 6, and while the paired relation of the axles is maintained each has an independent mounting therefor, which will hereinafter be described.

All of the wheel-carrying axles are of a crank form, essentially consisting of a single crank-arm portion 7, carrying at its lower end a wheel-spindle 8 and at its upper end a substantially horizontal journal 9, having a suitable mounting in a sleeve or equivalent bearing 10, mounted on the lower side of the vehicle-body. There is a sleeve or equivalent bearing 10 for each pair of the crank-axles. Those forming the front pair are designated by the reference-character F, and those forming the rear pair are designated by the reference-character R, and the sleeves or equivalent bearings 10 for the front and rear axles F and R are mounted upon the lower side of the vehicle-body a short distance from the end, although the essential feature is to dispose the sleeves or equivalent bearings 10 at an intermediate point of the vehicle-body at the inner side of the end body-supporting springs 4, as plainly shown in Figs. 1 and 2 of the drawings.

The journal members 9 of each pair of crank-axles are longitudinally alined in the common bearing therefor to provide a proper positioning of parts when the vehicle is running on a straight stretch; but by reason of the independent journaling of the members 9 each crank-axle is capable of an independent swinging motion, so as to adjust itself to the inclination of the vehicle-body, whereby the wheels may always be maintained in parallelism to the sides of the body, as shown in Fig. 4. In connection with these crank-axles it is to be observed that the same are held at the proper working relation to the vehicle-body and its supports through the medium of suitable connection between the axles of each pair and the transverse body-supporting springs 4. This connection may be conveniently effected by the employment of links 11, loosely connecting the opposite terminals of each body-supporting spring 4 to the adjacent axles contiguous to the wheel-hubs, as may be best seen in Figs. 3 and 4 of the drawings.

To provide for maintaining the body in a level or upright position and also for inclining the same to the right or to the left in rounding a curve or corner, there is employed some suitable mechanism for accomplishing this result. For illustrative purposes there is suggested in the drawings an operative arrangement of parts involving the usual steering-post 12, having a worm-gear or equivalent connection 13 with an arm member 14, connected to and carried by the longitudinal reach-shaft 2 at the front end thereof. By reason of this arrangement through manipulation of the steering-post 12 the body may be inclined to the right or to the left of its longitudinal axis. This motion may also be utilized to turn the front wheels 5. This may be accomplished in numerous ways; but a simple expedient is shown in the drawings, and consists in rigidly mounting on the under side of the vehicle-body a stationary fulcrum-bracket 15, projecting downwardly from a suitable point on the body above the hubs of the front wheels and having an operative connection with the usual steering-knuckles 16 through the medium of rods or equivalent connections 17. Through the employment of such an expedient when the steering-post is turned the body is tilted to the desired inclination, the front wheels are turned, and at the same time all of the wheels are thrown obliquely to a vertical plane through maintaining a parallelism to the body sides. This is effected through the agency of the crank-axles whose journal portions turn or rock in their bearings at the under side of the body.

Power may be transmitted to the vehicle in any suitable way; but a preferred arrangement is shown in the drawings, and consists in mounting at the under side of the vehicle-body a power-transmitting counter-shaft 18, having a driving connection with the motor 19 and extending transversely across the body. At its ends the shaft 18 carries sprocket-pinions 20, having direct chain connections 21 with the sprocket-gears 22 on the hubs of the rear wheels 6. This arrangement of driving-gear causes the chains to always remain at the same tension, and as the wheels are constantly maintained in line with the sprockets on the counter-shaft the chains cannot slip off.

From the foregoing it is thought that the construction, operation, and many advantages of the herein-described running-gear will be readily understood without further description, and it will be understood that various changes may be made in the form, proportion, and minor details of construction without departing from the principle or sacrificing any of the advantages of the invention, and I accordingly reserve the right to make such changes as fall within the scope of the appended claims.

Having thus described the invention, what I claim as new is—

1. In a running-gear for vehicles, the combination with a body, and wheel-supporting means, of means for causing the body and wheels to synchronously tilt in the same direction.

2. In a running-gear for vehicles, the combination with the body, wheel-supporting means for causing the body and wheels to synchronously tilt in the same direction and to the same angle, whereby a parallelism of the wheels with reference to the sides of the body is maintained.

3. In a running-gear for vehicles, the combination of means for supporting the body to tilt transversely on a longitudinal axis, and self-adjusting wheel-supports comprising means for causing the wheels to tilt synchronously with the body in the same direction and to the same angle.

4. In a running-gear for vehicles, the combination with the transversely-tiltable body, of supporting means for the body including a central longitudinal axis upon which the same tilts, and front and rear pairs of independently self-adjusting wheel-carrying axles mounted upon the body and comprising means for causing the wheels to tilt synchronously with the body and maintain their parallelism with the sides thereof.

5. In a running-gear for vehicles, the combination of a transversely-tiltable body, a longitudinally-arranged reach-shaft loosely supporting the body for tilting, front and rear pairs of wheel-carrying crank-shaped axles having an inner journal mounted upon the vehicle-body, transversely-arranged body-supporting springs having rigid connection with the ends of the reach-shaft and at their terminals having loose link connections with the adjacent crank-axles contiguous to the wheels, and combined adjusting and steering means.

6. In a running-gear for vehicles, the combination of a transversely-tiltable body, a longitudinal reach-shaft loosely supporting the body, front and rear pairs of self-adjusting crank-axles having inner journals mounted upon the body at an intermediate point thereof, the axles of the front pair having steering-knuckles, body-supports connected with the reach-shaft and with the axles, a steering connection between the body and the knuckles, and an adjusting device carried by the body and operatively related to the reach-shaft for effecting a tilt of the body and a synchronous turning of the front wheels.

7. In a running-gear for motor-vehicles, the combination with a transversely-tiltable body, supporting means for the body, self-adjusting wheel-carrying axles mounted upon the body and comprising means for causing the wheels to tilt in unison with the body and maintain their parallelism thereto, and driving mechanism including a transversely-arranged counter-shaft carried by the body having driving-chain connections with the rear wheels.

In testimony whereof I affix my signature in presence of two witnesses.

JOHN F. MURPHY.

Witnesses:
   EMORY J. WOOD,
   GEO. W. FORD.